April 23, 1946.  A. H. SCHUTTE  2,398,967
CENTRIFUGAL SEPARATOR
Filed April 9, 1943  2 Sheets-Sheet 1
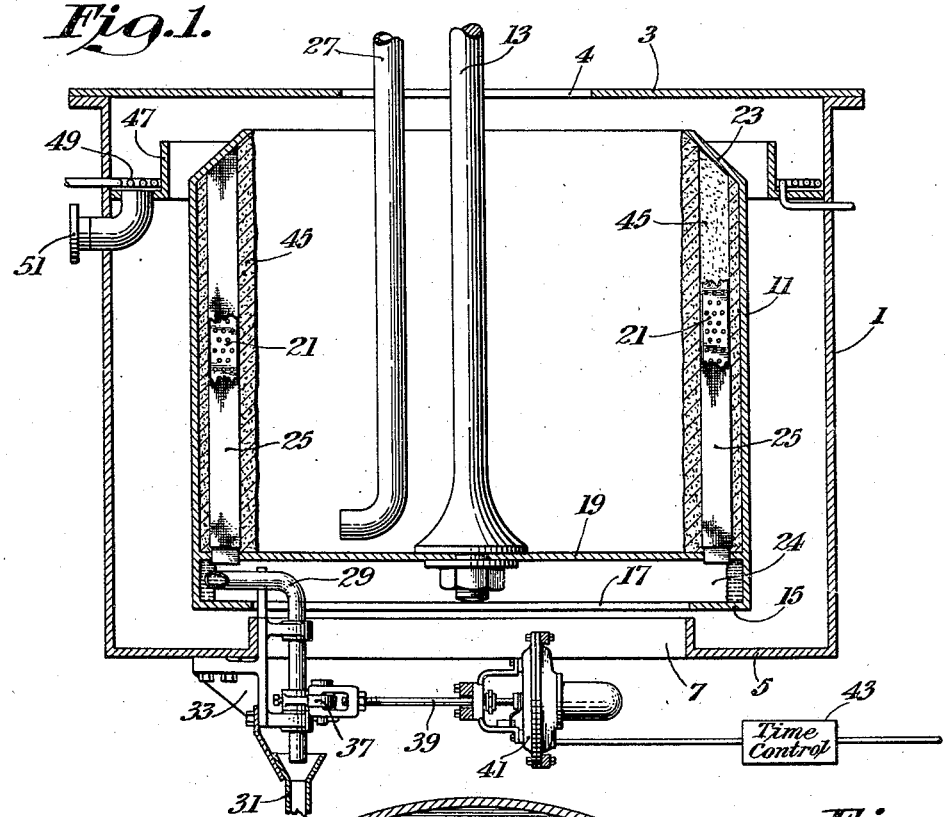
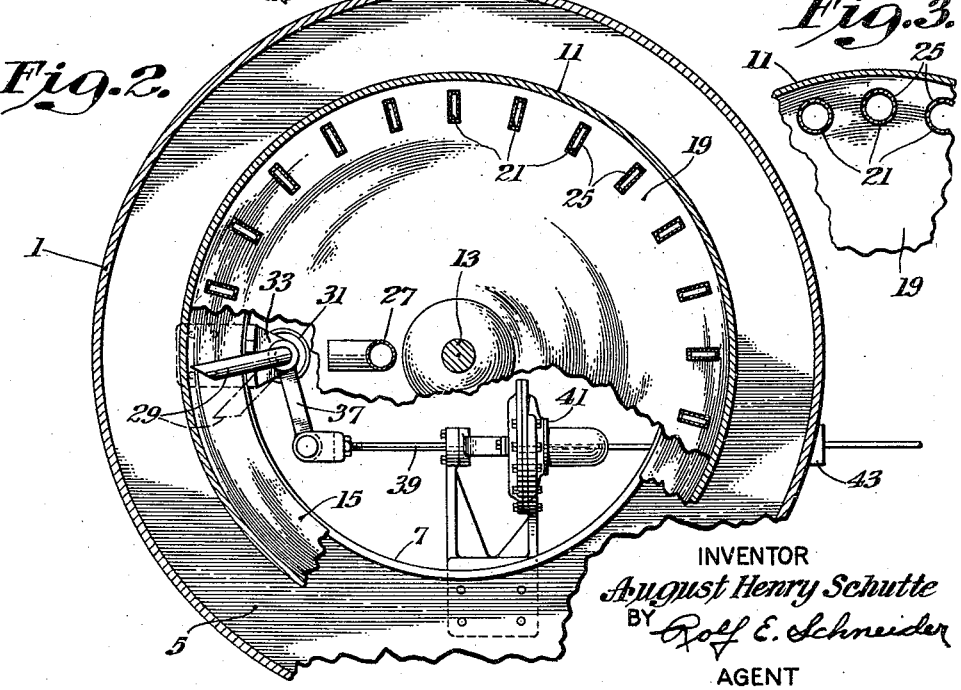
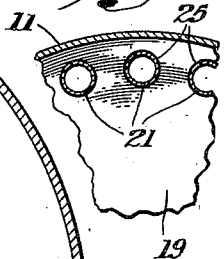
INVENTOR
August Henry Schutte
BY Rolf E. Schneider
AGENT INVENTOR
August Henry Schutte
BY Rolf E. Schneider
AGENT Patented Apr. 23, 1946

2,398,967

UNITED STATES PATENT OFFICE 2,398,967

CENTRIFUGAL SEPARATOR

August Henry Schutte, Hastings on Hudson, N. Y.

Application April 9, 1943, Serial No. 482,465

6 Claims. (Cl. 210—68)

This invention relates to a method and apparatus for separating the liquid constituents of a liquid-solid emulsion wherein the emulsion is introduced into a centrifugal bowl separator. Particularly, the invention pertains to an apparatus for carrying out the liquid-solid separation in such a manner that the separated solid materials in the form of a porous cake are periodically removed from the apparatus without stopping the rotation of the centrifugal bowl. While the apparatus is useful in carrying out the separation of all types of liquid-solid separation it is of particular importance in separating water and oil from an oil-wax mixture after said mixture has been emulsified in the manner described and claimed in my prior Patent No. 2,168,306, issued August 1, 1939. Essentially, this prior patent discloses the emulsifying of an oil-wax mixture with a third material that is immiscible with and a non-solvent for the oil-wax mixture. Such a mixture is emulsified by a suitable type of emulsifying apparatus whereby an emulsion of the materials is obtained. After the emulsion has been chilled or cooled down below the melting point of the solid constituents thereof the liquid constituents of the emulsion can be removed by centrifugal force. The solids of the emulsion are deposited in the form of a cake that is lighter than the heaviest component of the filtrate. However, with certain charging materials the conventional centrifugal filtering apparatus now available soon becomes clogged and it is practically impossible to run these apparatus for any substantial length of time. A further defect of available machines is the difficulty of removing the deposited solids from the machines without either stopping the machines or providing them with elaborate forms of scraping devices.

The salient features of the present invention include the construction of a centrifugal separating apparatus wherein the solid portions of the emulsion fed therethrough are deposited and the liquid constituents are continuously removed until the solids have built up into a layer of desired thickness whereupon the removal of the filtrates is held in abeyance and the accumulation of the separated filtrates is used for dislodging the solid material and permits it to be expelled from the apparatus. This depositing of the solids, removal of the filtrates, arresting the removal of the filtrates and the expulsion of the solids is accomplished in a time cycle synchronized with the feed of material into the apparatus and, thus, the cycle is automatic in operation and continues throughout the run of the machine.

With these broad objects in view, I have disclosed in the accompanying drawings two forms of apparatus for carrying out this timed cycle operation.

In the drawings:

Figure 1 is a vertical section taken centrally through a centrifuge, partly in cross-section and partly broken away to show the rotating bowl, filter leaves and skimmer mechanism;

Fig. 2 is substantially a top plan with the bottom wall broken away to illustrate the liquid skimmer and its operating mechanism;

Fig. 3 is a fragmental cross-section of a modification of the form of filter elements;

Figure 4:
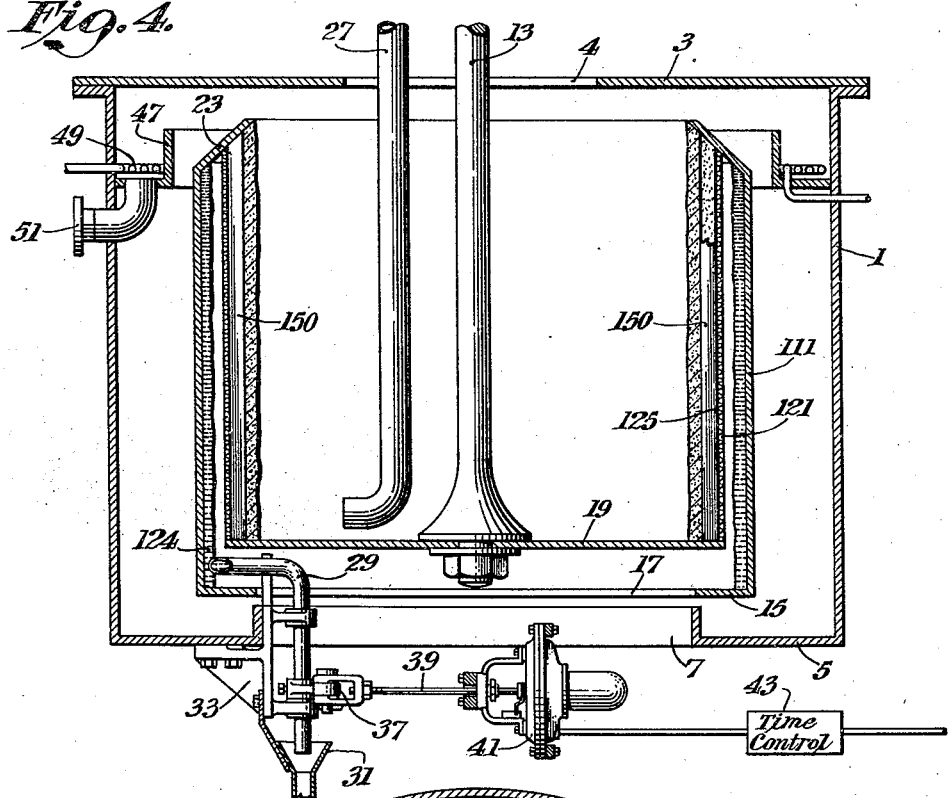
Fig. 4 is a substantially vertical section of a modification of the form of centrifugal basket.

In the preferred form of my liquid-solid separating apparatus illustrated in Figs. 1 and 2, numeral 1 denotes a stationary outer casing having a top 3 provided with a central opening 4 and a bottom 5 having a central aperture 7 therein for access of the skimmer mechanism as hereinafter described. Mounted for rotation within the outer casing 1 is a solid walled centrifugal bowl 11 which is suspended on vertical shaft 13 and is driven by a suitable power means not shown. The lower end wall 15 of the bowl 11 is also centrally apertured at 17 for reception of the filtrate removal apparatus.

A horizontal baffle or plate 19 is affixed across the lower part of the bowl 11 in spaced relation to the bottom wall 15 and to this plate the drive shaft 13 is secured. The plate 19 also supports a plurality of circumferentially spaced, vertically extending, perforated liquid drain tubes or filter leaves 21. These drain tubes are fitted through openings in the plate 19 and extend upwardly to or terminate adjacent the inturned cone shaped lip 23 of the centrifugal bowl. The lower open ends of the perforated pipes 21 discharge into a channel 24 defined by the spaced plate 19 and the annular end wall 15 of the bowl 11. Preferably, the radially positioned perforated drain tubes 21 are rectangular in cross-section and provided with removable filter cloths 25 therearound, although they may be circular in cross-section as shown in Fig. 3.

When an emulsified mixture is fed into the lower part of the rotating bowl 11 through pipe 27 a porous cake of the solid material of said emulsion is deposited in the bowl and the liquid constituents such as oil and water are filtered or drained off through the perforated filter pipes 21 into the lower annular channel 24. As the filtrate accumulates it is necessary to continuously remove it from the channel. This is automatically accomplished by a timed cycle operated skimmer pipe 29 having its outer bevelled end normally positioned adjacent the bowl wall. When the skimmer is so positioned, the annular moving layer of filtrate is scooped up and drained off through the lower portion of the skimmer pipe to a collection funnel 31 secured to a bracket 33 affixed to the underside 5 of the casing 1. The vertical part of the skimmer pipe 29 is mounted in bracket 33 and attached to a link arm 37 pivotally secured to the operating arm 39 of a reciprocating fluid motor or other motion-imparting device 41. This motor is controlled by a suitable time control apparatus 43 of conventional construction whereby the motor is periodically operated to rotate the skimmer pipe and withdraw its outer end from the layer of filtrate in the channel, as shown in the dotted line position of Fig. 2. This operation is timed to occur when the cake 45 in the centrifugal bowl is of sufficient thickness, as when its outer surface coincides with the edge of the cone 23. The emulsion feed is continued during the period the skimmer pipe is out of operative position, and, consequently, the layer of filtrate does not drain through pipe 29 and is not removed from the channel and, thus, builds up against the inner wall of the bowl 11 and forces the annular cake 45 radially inward throughout its height beyond the lip 23 whereby it is robbed of support and spills over the lip 23. The cake is collected in an annular trough 47 positioned in the upper part of the casing 1, having a heated liquefying coil 49 therein and a drain-off fitting 51.

The time control device 43 maintains the skimmer in retracted position a sufficient period for the cake expulsion and then returns the skimmer to its original position adjacent the inner wall of the channel 24. This sequence of operations continues during the run of the machine.

Figure 5:
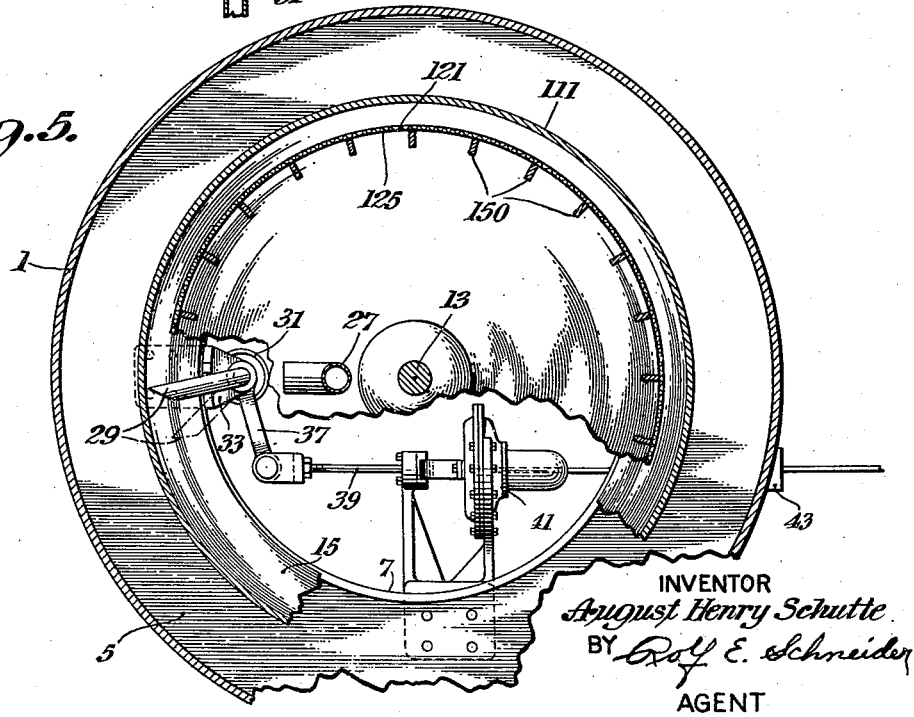
Fig. 5 is a top plan of, partly broken away, this modified construction.

The modified form of separating apparatus shown in Figs. 4 and 5 differs principally from the previously described form in the construction of the rotating bowl or basket 111 which, in this instance, is provided with an inner spaced perforated wall 121 carrying a filter medium 125. During operation of the modified apparatus, the liquid constituents of the emulsion are thrown outwardly and after passing through the filter cloth 125 and through the perforations in the wall 121 they are carried in the space between the filter wall 121 and the outer solid wall 111 of the bowl. During the filtration portion of the cycle the level or inner surface of the filtrate column 124 is farther from the axis of the separator than is the filter wall 121.

The lower end 124 of the liquid filtrate column is removed by contact with the skimmer pipe 29 until the cake builds up to a thickness equivalent to the distance between the filter wall 121 and the inner lip of the upper cone 23, whereupon the timing control device 43 rotates the skimmer pipe inwardly toward the axis of the basket. Filtrate then accumulates adjacent the solid outer wall throughout the length thereof and the whole cake is displaced radially inward and all or a portion thereof is expelled over the lip 23 into the collection trough 47.

In this modified form of separator it is advantageous to provide the inner perforated wall with a plurality of vertical, spaced, radial fins or driving baffles 150 for preventing the basket from running out of balance when the liquid level is high during the cake expulsion step.

A unique feature attendant to both forms of apparatus is the back washing of the filter surfaces during each cake expulsion cycle. Thus, as the cake is forced radially inward the filtrate flows through the filter medium in a direction opposite to the flow during the period when filtrate is being withdrawn.

Under certain conditions of the type of emulsion feed and precise adjustment of the skimmer 29, after disconnecting the time control 43, the machine may be set for the constant elimination of filtrate and the continuous discharge of cake.

Although the apparatus illustrated is disclosed as arranged to rotate on its vertical axis it will be distinctly understood by those skilled in the art that the apparatus is not so limited and may be arranged to operate on its horizontal axis with equal facility.

What I claim is:

1. A centrifugal separating apparatus comprising a rotatable drum open at one end to receive a mixture of liquid and solid materials, said drum having an imperforate side wall and also having an apertured end wall, a plate within the drum spaced from said apertured end wall to form a filtrate collection channel between said plate and said apertured end wall, a plurality of perforated drain tubes mounted upon said plate, said drain tubes extending substantially parallel to said imperforate side wall, and being spaced therefrom and circumferentially spaced from each other and said drain tubes providing communication from the interior of said drum to said filtrate collection channel, means to remove filtrate from said filtrate collection channel and means to rotate said drum.

2. A centrifugal separating apparatus as set forth in claim 1 wherein said drain tubes are covered with filter cloths.

3. A centrifugal separating apparatus as set forth in claim 1 wherein said drain tubes are rectangular in cross section.

4. A centrifugal separating apparatus as set forth in claim 1 wherein said drain tubes are circular in cross section.

5. A centrifugal filter apparatus comprising a rotatable drum open at one end to receive a mixture of a relatively heavy liquid and a relatively light solid for separation thereof and having an opposite end wall to retain the mixture within the drum, the circumferential wall of the drum being imperforate and having at the open end of the drum an annular inturned lip of substantial radial depth, means connected to the drum forming an annular filtrate-collecting channel at one end of the drum, and located at the opposite side of said end wall from said open end, said channel being concentric with the drum axis and open toward the axis, a filter structure within the drum, said filter structure being spaced from the imperforate circumferential wall of the drum and defining a filtrate eduction channel, means in said end wall providing communication between said eduction channel and said annular channel, said filter structure having a liquid-pervious side wall within the drum and including a filter cloth extending over said liquid-pervious side wall arranged to retain solids while permitting passage therethrough of liquid entering said eduction channel from the drum, scoop means associated with said annular channel to withdraw the filtrate therefrom during rotation of the drum, and power operated means rendering said scoop means operative during rotation of the drum to control filtrate withdrawal to regulate the radial depth of filtrate within the annular channel, to enable passage of filtrate from the eduction channel to the annular channel in one position of the scoop means and to enable, in another position of the scoop means, a build up of the radial depth of filtrate within the annular channel to oppose delivery of filtrate from the eduction channel to the annular channel and thereby cause an accumulation of filtrate adjacent the filter structure to displace an accumulated cake of the separated solid radially inward for axial discharge past said lip, means for intermittently energizing said power operated means and means to rotate said drum.

6. A centrifugal filter apparatus for separating a mixture of a liquid and a lighter solid, comprising a rotatable drum open at one end to receive a mixture of liquid and solid materials and having an opposite end wall to retain the mixture within the drum, the circumferential wall of the drum being imperforate and having at the open end of the drum an annular inturned lip of substantial radial depth, means connected to the drum and forming an annular filtrate-collecting channel and located at the opposite side of said end wall from said open end of the drum and concentric with the drum axis and open toward the axis, a plurality of foraminous filter tubes spaced outwardly from the drum axis and spaced circumferentially from each other and extending longitudinally of the axis between said lip and said end wall, said tubes being mounted in said end wall of said drum, each of said tubes defining a filtrate drain channel opening at one end thereof into said annular channel at a point spaced radially outward from the open side of the latter, scoop means associated with said annular channel to withdraw the filtrate therefrom during rotation of the drum, and means rendering said scoop means adjustable in said annular channel during rotation of the drum to regulate the radial depth of the filtrate within the annular channel, to enable passage of filtrate from said drain channels to the annular channel when the scoop means is in one position and to enable, in a second position of the scoop means, a build-up of said radial depth to oppose delivery of the filtrate from the drain channels to the annular channel and thereby cause an accumulation of filtrate adjacent said drain tubes to displace an accumulated cake of the separated solid radially inward for axial discharge past said lip, there being means present to rotate said drum.

AUGUST HENRY SCHUTTE.